(12) United States Patent
Fox et al.

(10) Patent No.: US 12,103,205 B2
(45) Date of Patent: Oct. 1, 2024

(54) METHOD AND APPARATUS FOR HOLDING GLOVE MOLDS

(71) Applicant: Summit Glove Inc., Minerva, OH (US)

(72) Inventors: Mitchell David Fox, Carrollton, OH (US); James L Hull, Malvern, OH (US)

(73) Assignee: SUMMIT GLOVE INC., Minerva, OH (US)

( * ) Notice: Subject to any disclaimer, the term of this patent is extended or adjusted under 35 U.S.C. 154(b) by 197 days.

(21) Appl. No.: 17/979,494

(22) Filed: Nov. 2, 2022

(65) Prior Publication Data

US 2024/0140001 A1 May 2, 2024

(51) Int. Cl.
*B29C 33/30* (2006.01)
*B29C 41/14* (2006.01)
*B29C 41/38* (2006.01)
*B29L 31/48* (2006.01)

(52) U.S. Cl.
CPC ............ *B29C 33/305* (2013.01); *B29C 41/14* (2013.01); *B29C 41/38* (2013.01); *B29L 2031/4864* (2013.01)

(58) Field of Classification Search
CPC ....... B29C 33/305; B29C 41/14; B29C 41/38; B29L 2031/4864
USPC ....... 425/182, 269, 270, 271, 272, 273, 274, 425/275
See application file for complete search history.

(56) References Cited

U.S. PATENT DOCUMENTS

| | | | | | |
|---|---|---|---|---|---|
| 1,458,185 | A | * | 6/1923 | Hemphill | B29C 41/38 |
| | | | | | 425/269 |
| 2,384,741 | A | * | 9/1945 | Hemphill | B29C 41/38 |
| | | | | | 425/269 |
| 2002/0076503 | A1 | * | 6/2002 | Borreani | B29C 41/20 |
| | | | | | 427/456 |

FOREIGN PATENT DOCUMENTS

| | | | | | |
|---|---|---|---|---|---|
| CN | 108407166 | A | * | 8/2018 | ............ B29C 41/14 |
| CN | 113352510 | A | * | 9/2021 | |
| CN | 114770837 | A | * | 7/2022 | |
| GB | 653103 | A | * | 5/1951 | |

* cited by examiner

*Primary Examiner* — Robert B Davis
(74) *Attorney, Agent, or Firm* — Sand, Sebolt & Wernow Co., LPA (57) ABSTRACT

An assembly for use with a glove manufacturing system is provided. There may be an assembly having first and second holders that engage a glove mold. The first and second holders have respective ledges that each engage respective first and second sides of an edge that defines a slot in the glove mold. With the first and second holders coupled to the glove mold, a connector can connect the first and second holders to a support structure to thereby couple the glove mold the support structure. Then, the gloves may be formed through the use of the glove mold.

20 Claims, 5 Drawing Sheets

METHOD AND APPARATUS FOR HOLDING GLOVE MOLDS

TECHNICAL FIELD

This disclosure is directed to systems, device, assemblies and methods for manufacturing gloves.

BACKGROUND

Some gloves are fabricated by dipping a glove mold into liquefied material and then allowing that material to cure. To effectuate the dipping of the glove molds, the glove molds are connected to a support structure that supports the molds as they are dipped into the liquefied material. Once the material cures or semi-cures, the resultant formed glove may be removed from the mold.

The glove molds are often made from a fragile material, including but not limited to various ceramics. As such, great care must be taken when connecting the molds to the support structure to ensure they are not damaged. However, even with great care, the molds have a tendency to break or be damaged due to how and the manner in which they are connected to the support structure.

SUMMARY

Thus, what is needed is an improved device or assembly for coupling or connecting glove molds to a support structure in order to reduce damage to the relatively fragile glove molds. The present disclosure addresses this issue by providing an assembly and method thereof that couples a glove mold to a support structure.

In one aspect, an exemplary embodiment of the present disclosure may provide an assembly for holding a glove mold, the assembly comprising: a first holder having a first ledge adapted to engage a first side of an edge defining a slot in a glove mold; a second holder having a second ledge adapted to engage a second side of the edge defining the slot in the glove mold; and a center member adapted to be interposed between the first holder and the second holder. This exemplary embodiment or another exemplary embodiment may further provide a first connector associated with the first holder to connect the first holder to a platform that supports the glove mold. This exemplary embodiment or another exemplary embodiment may further provide a second connector associated with the second holder to connect the second holder to the platform that supports the glove mold. This exemplary embodiment or another exemplary embodiment may further provide a first convexly curved sidewall extending from the first ledge on the first holder. This exemplary embodiment or another exemplary embodiment may further provide a radius of curvature of the first convexly curved sidewall, wherein the radius of curvature is complementary to that of the first side of the edge defining the slot in the glove mold. This exemplary embodiment or another exemplary embodiment may further provide a second convexly curved sidewall extending from the second ledge on the second holder; and a radius of curvature of the second convexly curved sidewall, wherein the radius of curvature of the second convexly curved sidewall is complementary to that of the second side of the edge defining the slot in the glove mold. This exemplary embodiment or another exemplary embodiment may further provide that the center member is T-shaped in configuration. This exemplary embodiment or another exemplary embodiment may further provide a flat sidewall on the first holder; and a lower depending portion on the center member, wherein the flat sidewall on the first holder abuts the lower depending portion on the center member. This exemplary embodiment or another exemplary embodiment may further provide a top wall on the first holder, wherein the top wall is D-shaped in configuration. This exemplary embodiment or another exemplary embodiment may further provide a first bore extending fully through the first holder; and a second bore extending fully through the second holder.

In another aspect, an exemplary embodiment of the present disclosure may provide a holder for a glove mold, the holder comprising: a body having a top surface opposite a bottom surface, wherein a vertical direction is defined between the top surface and the bottom surface; a vertical axis extending through the body; a curved first sidewall positioned between the top surface and the bottom surface, wherein the curved first sidewall has a radius of curvature relative to the vertical axis; a ledge positioned between the curved sidewall and the bottom surface, wherein the ledge extends radially farther from the vertical axis than the curved first sidewall, and the ledge is adapted to engage an edge defining a slot in a glove mold; and a second sidewall extending between the top surface and the bottom surface, wherein at least a portion of the second sidewall is flat and offset parallel to the vertical axis. This exemplary embodiment or another exemplary embodiment may further provide a chamfered surface positioned between the ledge and the bottom surface. This exemplary embodiment or another exemplary embodiment may further provide a bore defined in the body, wherein the bore extends in the vertical direction. This exemplary embodiment or another exemplary embodiment may further provide that the bore extends fully from the top surface to the bottom surface. This exemplary embodiment or another exemplary embodiment may further provide a channel formed in the curved first sidewall.

In yet another aspect, another exemplary embodiment of the present disclosure may provide a method comprising: inserting a first holder having a first ledge into a slot defined in a glove mold; moving the first holder laterally towards a first side of the slot; inserting a second holder having a second ledge into the slot defined in the glove mold; moving the second holder laterally towards a second side of the slot; and supporting the glove mold via the first ledge and the second ledge. This exemplary embodiment or another exemplary embodiment may further provide coupling the first holder to a support structure via a first connector that extends into a bore defined in the first holder; and coupling the second holder to the support structure via a second connector that extends into a bore defined in the second holder. This exemplary embodiment or another exemplary embodiment may further provide abutting a first convexly curved sidewall on the first holder with a wall defining an edge of the slot at the first side; and abutting a second convexly curved sidewall on the second holder with the wall defining the edge of the slot at the second side. This exemplary embodiment or another exemplary embodiment may further provide inserting a center member into the slot between the first holder and the second member after the first holder and second holder have been laterally moved. This exemplary embodiment or another exemplary embodiment may further provide dipping the glove mold into a container of liquefied glove material; removing the glove mold from the container; and permitting the liquefied glove material to cure into a glove.

In yet another aspect, an exemplary embodiment of the present disclosure may provide a glove manufacturing system having an assembly. The assembly has first and second holders that engage a glove mold. The first and second holders have respective ledges that each engage respective first and second sides of an edge or wall that defines a slot in the glove mold. With the first and second holders coupled to the glove mold, a connector can connect the first and second holders to a support structure to thereby couple the glove mold the support structure. Then, the gloves may be formed through the use of the glove mold.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

The Figures depict an assembly 10 for holding a glove mold 1000. The assembly includes a first holder 12-1, a second holder 12-2, and a center member 14. The first holder 12-1, the second holder 12-2, and the center member 14 cooperate to connect the glove mold 1000 to a support structure 1002, such as a platform, pallet, or any other rigid framework.

In one embodiment, the first holder 12-1 and the second holder 12-2 are constructed as mirrored structures relative to each other. Each of the first holder 12-1, the second holder 12-2, and the center member 14 may be a unibody that is integrally extruded, molded, printed, or additively manufactured, removably machined, or formed as a unitary, monolithic member substantially fabricated from a rigid, man-made, material. In one example, metal or metal alloys, such as stainless steel or aluminum alloy, may form a substantial majority of the components or elements used to fabricate each of the first holder, the second holder, and the center member and the various components integrally formed, molded, or extruded therewith. The rigid body of each of the first holder 12-1, the second holder 12-2, and the center member 14 should withstand typical glove mold manufacturing operations from an operator connecting the assembly to glove mold 1000 and connecting the same to platform 1002. In another example, each of the first holder 12-1, the second holder 12-2, and the center member 14 may be formed from an elastomeric material or rubber material configured to withstand deformation upon impact or bending by the operator (i.e., a glove manufacturer). Furthermore, while the components of each of the first holder 12-1, the second holder 12-2, and the center member 14 are discussed below individually, it is to be clearly understood that the components and their corresponding reference elements of each of the first holder 12-1, the second holder 12-2, and the center member 14 are portions, regions, or surfaces of the body and all form a respective element or component of the unitary body. Thus, while the components may be discussed individually and identified relative to other elements or components of each of the first holder 12-1, the second holder 12-2, and the center member 14, in this exemplary embodiment, there is each of the first holder 12-1, the second holder 12-2, and the center member 14 that have the below described portions, regions, or surfaces.

Figure 1A:
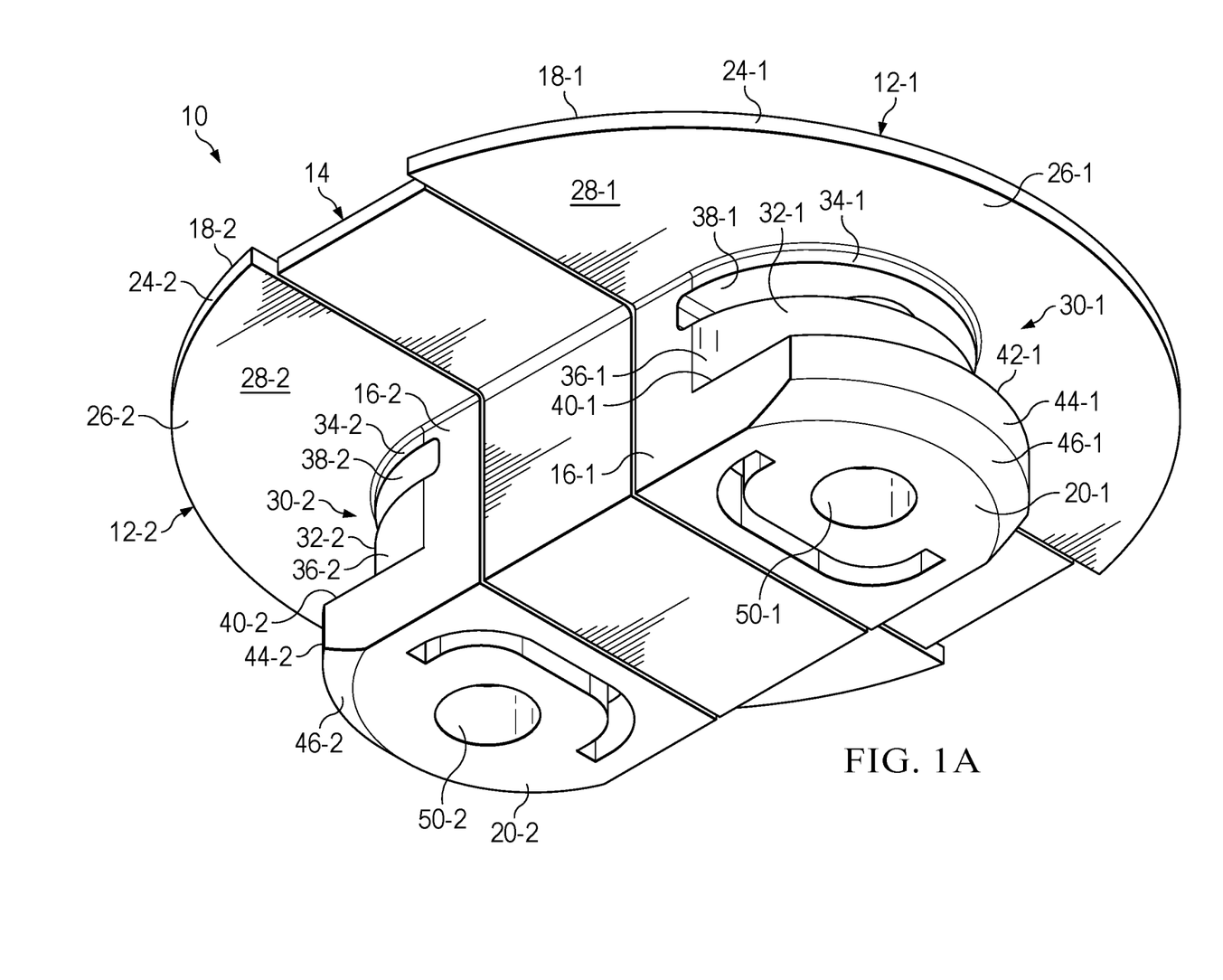
FIG. 1A (FIG. 1A) is a bottom perspective view of an assembly for holding a glove mold according to one exemplary aspect of the present disclosure.
Figure 1B:
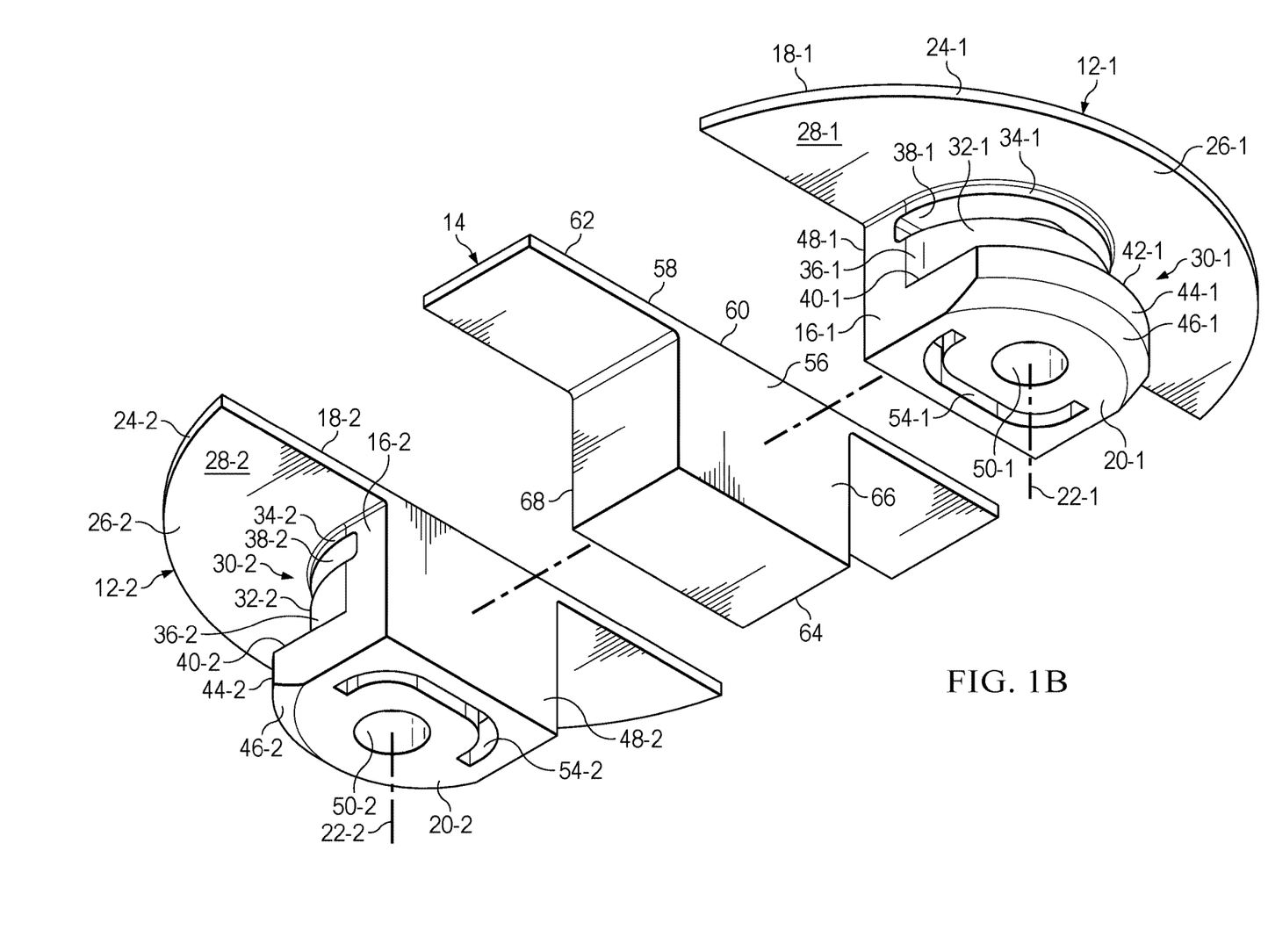
FIG. 1B (FIG. 1B) is an exploded bottom perspective view of the assembly for holding the glove mold according to one exemplary aspect of the present disclosure.

The first holder 12-1 has a body 16-1. The body 16-1 of the first holder 12-1 has a top surface 18-1 opposite a bottom surface 20-1. A vertical direction is defined between the top surface 18-1 and the bottom surface 20-1. There may be a vertical axis 22-1 extending through the body 16-1. The top surface 18-1 is bound by an edge 24-1 of a top wall 26-1 of the body 16-1. A short sidewall extends downward in the vertical direction from the edge 24-1 of the top surface 18-1. The dimension of the short sidewall is dictated by the thickness of the top wall 26-1 of the body 16-1. The edge 24-1 of the top wall 26-1 is generally D-shaped or semicircular in configuration. The top wall 26-1 has a lower surface 28-1 opposite the top surface 18-1.

A central portion 30-1 of the body 16-1 extends downward in the vertical direction from the lower surface 28-1 of the top wall 26-1. The central portion 30-1 of the body 16-1 has a curved first sidewall 32-1. The curved first sidewall 32-1 is positioned between the top surface 18-1 and the bottom surface 20-1. The curved first sidewall 32-1 has an upper end 34-1 and a lower end 36-1. More particularly, the curved first sidewall 32-1 extends downward from the upper end 34-1 having a fixed rigid connection with lower surface 28-1 of the top wall 26-1 of the body 16-1. The curved first sidewall 32-1 has a radius of curvature relative to the vertical axis 22-1. The radius of curvature is complementary to that of a first side 1004 of an edge 1006 defining a slot 1008 in the glove mold 1000.

There is a channel 38-1 formed in the curved first sidewall 32-1. The channel 38-1 is located closer the upper end 34-1 of the curved first sidewall 32-1 than the lower end 36-1 of the curved first sidewall 32-1. The channel 38-1 extends inwardly toward the vertical axis 22-1 from the curved first sidewall 32-1. Channel 38-1 may intersect the vertical axis 22-1. The channel 38-1 is further bound by a flat upper surface and a flat lower surface that are orthogonal to the vertical axis. As such, the channel 38-1 is generally C-shaped in cross section.

A ledge 40-1 is positioned between the curved sidewall 32-1 and the bottom surface 20-1 of the holder 12-1. More particularly, the ledge 40-1 is connected with the lower end 36-1 of the curved first sidewall 32-1. The ledge 40-1 defines a ledge surface that is orthogonal to the vertical axis. The ledge 40-1 extends radially outward from the curved first sidewall 32-1 to a ledge outer edge 42-1. The ledge 40-1 extends radially farther from the vertical axis 22-1 than the curved first sidewall 32-1. The ledge 40-1 is adapted to engage the lower end of a wall 1010 forming the first end 1004 of edge 1006 defining the slot 1008 in the glove mold 1000.

The ledge 40-1 is part of a bottom wall 44-1, wherein the ledge surface is the upper surface of the bottom wall 44-1, and the bottom surface 20-1 of the holder 12-1 is defined by the lower end of the bottom wall 44-1. The bottom wall 44-1 has a chamfered surface 46-1 that connects with the bottom surface 20-1 (i.e., the lower surface of bottom wall 44-1).

The body 16-1 of holder 12-1 has a second sidewall 48-1 extending between the top surface 18-1 and the bottom surface 20-1, wherein at least a portion of the second sidewall 48-1 is flat and offset parallel to the vertical axis 22-1. In one particular embodiment, the entire second sidewall 48-1 is flat between the top surface 18-1 and the bottom surface 20-1. The flat second sidewall 48-1 is offset parallel to the vertical axis 22-1.

The body 16-1 of holder 12-1 defines a bore 50-1 that extends through at least a portion of the body 16-1. In one particular embodiment, the bore 50-1 extends fully through the body from the top surface 18-1 to the bottom surface 20-1. The vertical axis 22-1 may extend centrally through the bore 50-1, however it is possible for the vertical axis 22-1 to be located at other locations through the body.

Figure 4:
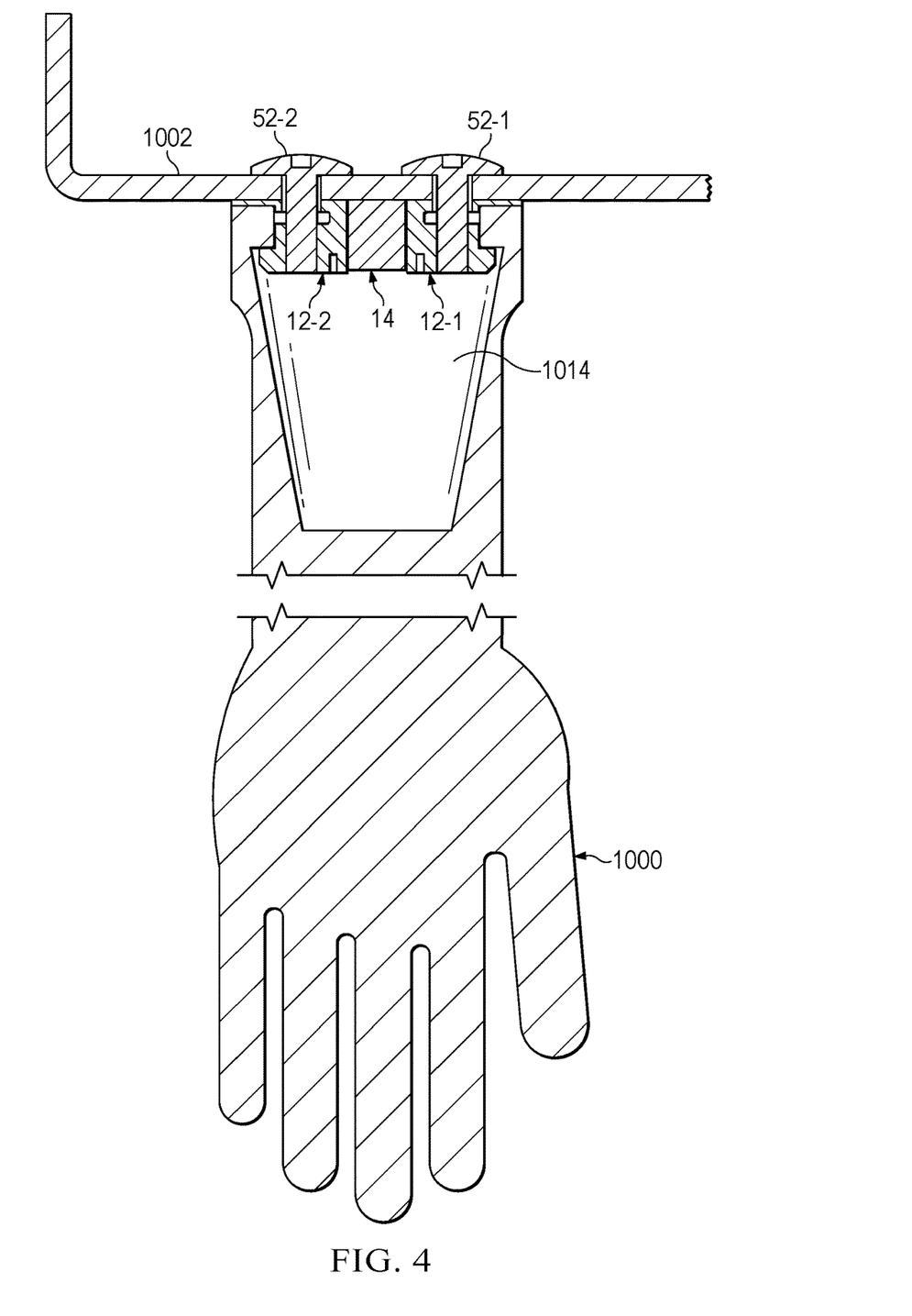
FIG. 4 (FIG. 4) is an operational cross section view of the assembly being used to connect the glove mold to a support structure.

The bore 50-1 is configured to receive a portion of a connector 52-1 therethrough. The connector may be formed by two complementary mechanical connectors. For example, the connector may include a first portion, which may be a screw, and a second portion, which may be a nut. The screw would then extend through the bore 50-1 to connect the holder 12-1 with the support structure 1002 and the nut would then be used to connect with the screw thereby coupling the holder to the support structure. Alternatively, bore 50-1 may be threaded to directly receive connector 52-1.

The body 16-1 may have a C-shaped recess 54-1 formed in the bottom 20-1 of body 16-1 that extends upwardly in the vertical direction into the body such that the depth of recess 54-1 is parallel to the axis 22-1. Recess 54-1 may partially circumscribe bore 50-1. Recess 54-1 is located on an opposite side of axis 22-1 than the chamfered wall 46-1. Although recess 54-1 is shown as having a general C-shape configuration, other configurations of recess 54-1 are possible.

The second holder 12-2 has a body 16-2. The body 16-2 of the second holder 12-2 has a top surface 18-2 opposite a bottom surface 20-2. A vertical direction is defined between the top surface 18-2 and the bottom surface 20-2. There may be a vertical axis 22-2 extending through the body 16-2. The top surface 18-2 is bound by an edge 24-2 of a top wall 26-2 of the body 16-2. A short sidewall extends downward in the vertical direction from the edge 24-2 of the top surface 18-2. The dimension of the short sidewall is dictated by the thickness of the top wall 26-2 of the body 16-2. The edge 24-2 of the top wall 26-2 is generally D-shaped or semicircular in configuration. The top wall 26-2 has a lower surface 28-2 opposite the top surface 18-2.

A central portion 30-2 of the body 16-2 extends downward in the vertical direction from the lower surface 28-2 of the top wall 26-2. The central portion 30-2 of the body 16-2 has a curved first sidewall 32-2. The curved first sidewall 32-2 is positioned between the top surface 18-2 and the bottom surface 20-2. The curved first sidewall 32-2 has an upper end 34-2 and a lower end 36-2. More particularly, the curved first sidewall 32-2 extends downward from the upper end 34-2 having a fixed rigid connection with lower surface 28-2 of the top wall 26-2 of the body 16-2. The curved first sidewall 32-2 has a radius of curvature relative to the vertical axis 22-2. The radius of curvature is complementary to that of a second side 1012 of edge 1006 defining a slot 1008 in the glove mold 1000.

There is a channel 38-2 formed in the curved first sidewall 32-2. The channel 38-2 is located closer the upper end 34-2 of the curved first sidewall 32-2 than the lower end 36-2 of the curved first sidewall 32-2. The channel 38-2 extends inwardly toward the vertical axis 22-2 from the curved first sidewall 32-2. Channel 38-2 may intersect the vertical axis 22-2. The channel 38-2 is further bound by a flat upper surface and a flat lower surface that are orthogonal to the vertical axis. As such, the channel 38-2 is generally C-shaped in cross section.

A ledge 40-2 is positioned between the curved sidewall 32-2 and the bottom surface 20-2 of the holder 12-2. More particularly, the ledge 40-2 is connected with the lower end 36-2 of the curved first sidewall 32-2. The ledge 40-2 defines a ledge surface that is orthogonal to the vertical axis 22-2. The ledge 40-2 extends radially outward from the curved first sidewall 32-2 to a ledge outer edge 42-2. The ledge 40-2 extends radially farther from the vertical axis 22-2 than the curved first sidewall 32-2. The ledge 40-2 is adapted to engage the lower end of wall 1010 forming the second side 1012 of edge 1006 defining the slot 1008 in the glove mold 1000.

The ledge 40-2 is part of a bottom wall 44-2, wherein the ledge surface is the upper surface of the bottom wall 44-2, and the bottom surface 20-2 of the holder 12-2 is defined by the lower end of the bottom wall 44-2. The bottom wall 44-2 has a chamfered surface 46-2 that connects with the bottom surface 20-2 (i.e., the lower surface of bottom wall 44-2).

The body 16-2 of holder 12-2 has a second sidewall 48-2 extending between the top surface 18-2 and the bottom surface 20-2, wherein at least a portion of the second sidewall 48-2 is flat and offset parallel to the vertical axis 22-2. In one particular embodiment, the entire second sidewall 48-2 is flat between the top surface 18-2 and the bottom surface 20-2. The flat second sidewall 48-2 is offset parallel to the vertical axis 22-2.

The body 16-2 of holder 12-2 defines a bore 50-2 that extends through at least a portion of the body 16-2. In one particular embodiment, the bore 50-2 extends fully through the body from the top surface 18-2 to the bottom surface 20-2. The vertical axis 22-2 may extend centrally through the bore 50-2, however it is possible for the vertical axis 22-2 to be located at other locations through the body 16-2.

The bore 50-2 is configured to receive a portion of a connector 52-2 therethrough. The connector may be formed by two complementary mechanical connectors. For example, the connector may include a first portion, which may be a screw, and a second portion, which may be a nut. The screw would then extend through the bore 50-2 to connect the holder 12-2 with the support structure 1002 and the nut would then be used to connect with the screw thereby coupling the holder to the support structure. Alternatively, bore 50-2 may be threaded to directly receive connector 52-2.

The body 16-2 may have a C-shaped recess 54-2 formed in the bottom 20-2 of body 16-2 that extends upwardly in the vertical direction into the body such that the depth of recess 54-2 is parallel to the axis 22-2. Recess 54-2 may partially circumscribe bore 50-2. Recess 54-2 is located on an opposite side of axis 22-2 than the chamfered wall 46-2. Although recess 54-2 is shown as having a general C-shape configuration, other configurations of recess 54-2 are possible.

The center member 14 has a body 56 that is distinct and different from the bodies of the first holder 12-1 and the second holder 12-2, respectively. The body 56 of the center member 14 is generally T-shaped. The body of the center member has a top wall 58 that defines a top surface 60 that is bound by a top edge 62. The top edge 62 may be rectangular in configuration. The body 56 of the center member 14 has a lower depending portion 64 that extends downwardly from the top wall 58. The lower depending portion 64 defines a portion of a first sidewall 66 and second sidewall 68 of the center member 14. At least a portion of the first and second sidewalls 66, 68 of the body 56 of the center member 14 are flat or planar. The flat or planar portions of the first and second sidewall 66, 68 are configured to directly abut, respectively, the second sidewall 48-1 of the first holder 12-1 and the second sidewall 48-2 of the second holder 12-2 when the assembly 10 is assembled on the glove mold 1000.

Having thus described the various components of assembly 10. Reference will be made to its operation. The assembly 10 may be used in conjunction with a glove manufacturing system. The glove manufacturing system comprises the glove mold 1000, the assembly 10, the support structure 1002, and a container that contains liquefied glove material. The glove molds 1000 that are coupled to the support structure 1002 via the assembly of the present disclosure may be dipped into the liquefied glove material. Some exemplary liquefied glove material may include latex or other polymers. Then, the liquefied glove material is permitted to cure on the glove molds to form a glove. Once cured or semi-cured, the glove may then be removed from the mold for packaging, shipment, and/or sale.

Figure 2:
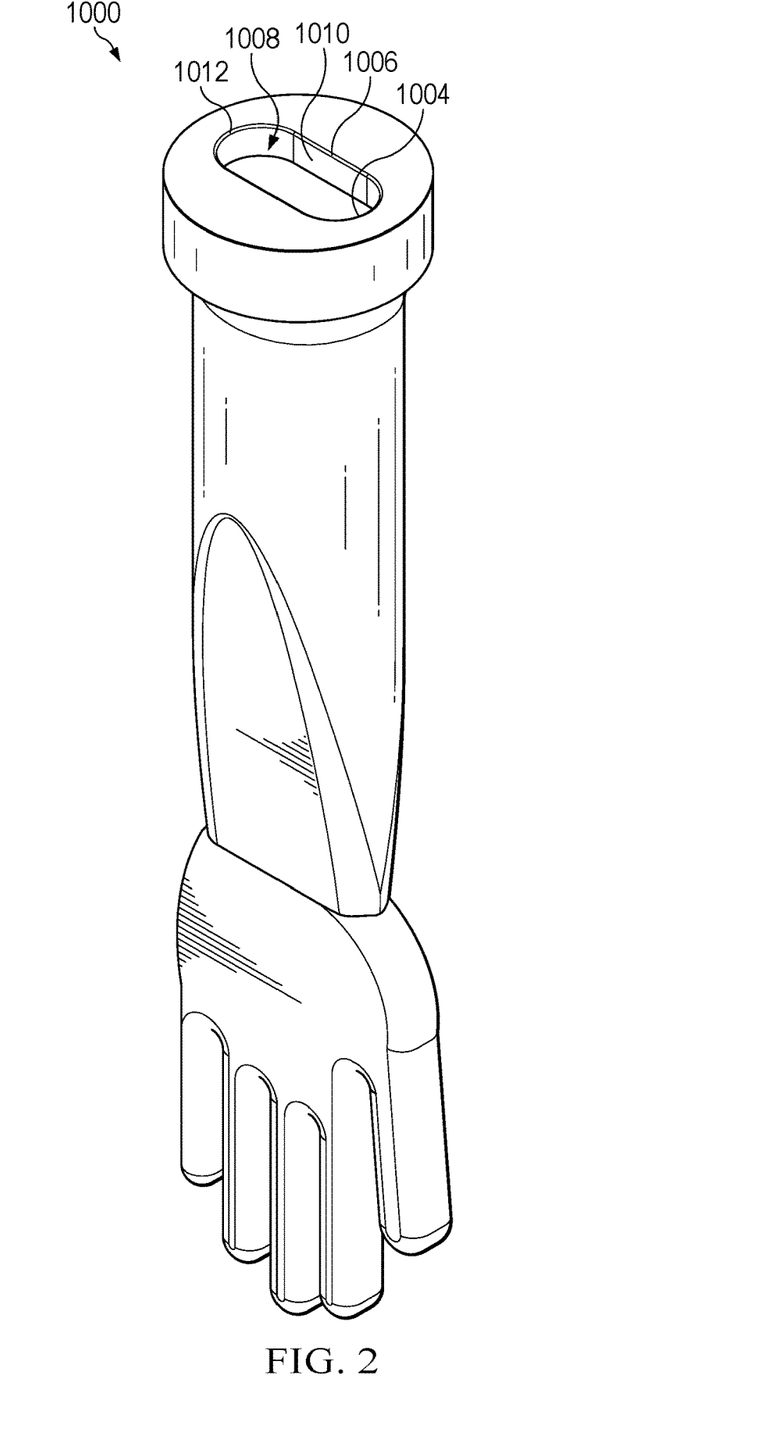
FIG. 2 (FIG. 2) is a top perspective view of an exemplary glove mold.

In operation, the glove mold 1000 is provided that will be used to form the glove. The glove mold 1000 has a first end defining five finger portions and a second end opposite the five finger portions. In some instances, the glove mold 1000 may be formed from a ceramic or other rigid body defining an interior volume 1014. The second end has the rounded rectangular edge 1006 defining slot 1008 that is in open communication with the interior volume 1014. The rounded rectangular edge 1006 has first side 1004 and second side 1012 opposite the first side 1004.

Figure 3:
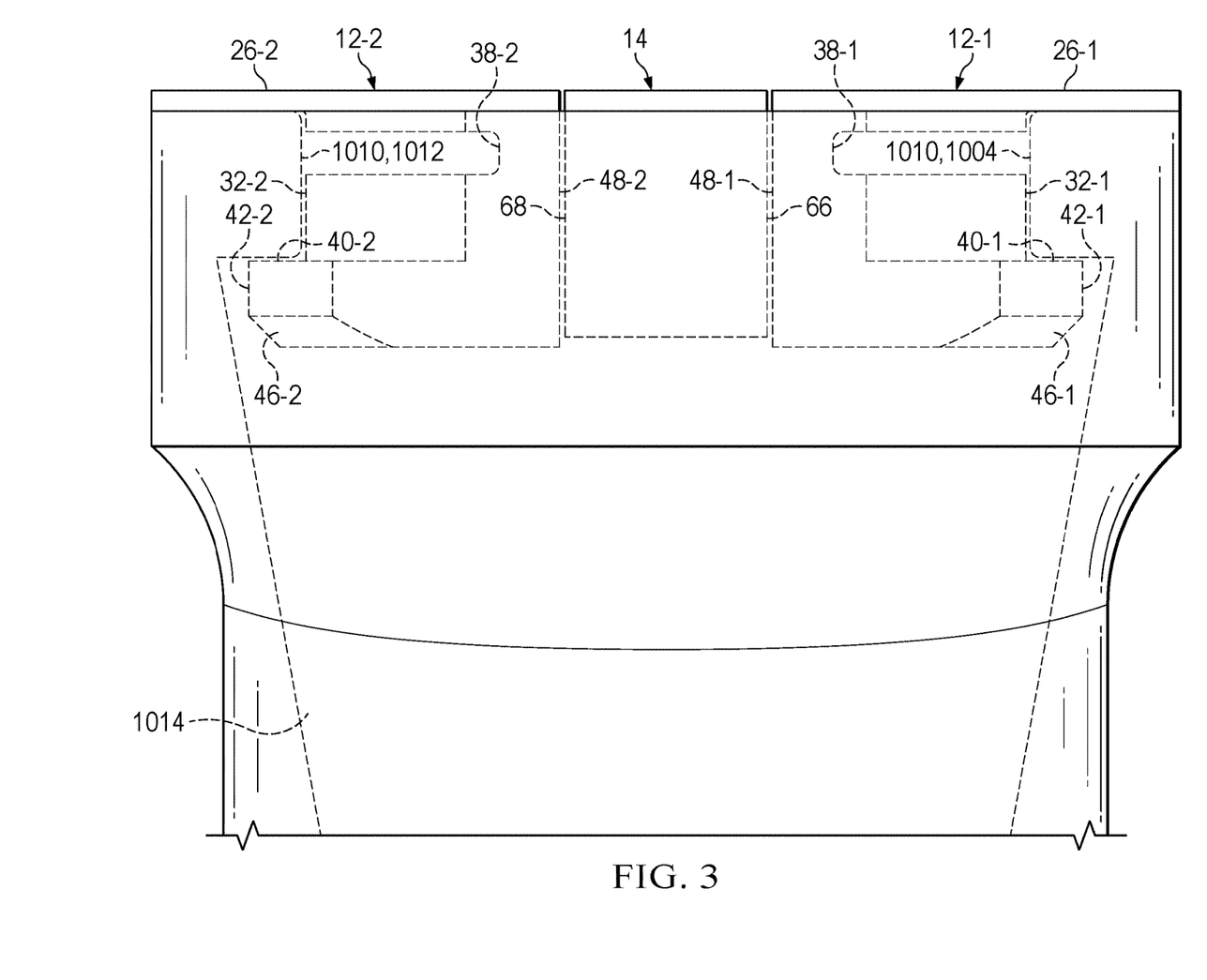
FIG. 3 (FIG. 3) in an enlarged top end elevation view of the glove mold with the assembly connected thereto and portions of the assembly disposed in the glove mold are shown in dashed lines.

The first holder 12-1 may be aligned with the slot 1008 in the glove mold 1000. Then, the first holder 12-1 may be partially disposed within the slot 1008 in the glove mold 1000. More particularly, the first holder 12-1 is aligned with the curved first sidewall 32-1 on the first holder facing the first side 1004 of the slot 1008. The first holder 12-1 is inserted into the slot 1008 and moved laterally. Inserting the first holder 12-1 into the slot 1008 may be accomplished by passing the bottom surface 20-1 of the body 16-1 of the first holder 12-1 downwardly past the rounded rectangular edge 1006. Then, the chamfered surface 46-1 is moved past the rounded rectangular edge 1006. Then, the first holder 12-1 is inserted slightly further to cause the ledge 40-1 of the first holder 12-1 to be disposed slightly beyond the rounded rectangular edge 1006 within the interior volume 1014. In one example, the first holder 12-1 is then slid laterally. Thus, sliding the first holder 12-1 towards the first side 1004 of the rounded rectangular edge 1006 causes the curved first sidewall 32-1 on the first holder to engage the wall 1010 of the first side 1004 of the rounded rectangular edge 1006. The top wall 26-1 has a greater dimension than the width of the slot 1008 to engage the top of the mold and prevent the holder 12-1 from falling through the slot 1008 into the interior volume 1014.

In operation, the ledge 40-1 of the first holder 12-1 engages the first side 1004 of the rounded rectangular edge 1006 of the glove mold 1000 from within the interior volume 1014. The first ledge 40-1 operates as a hook or support surface to engage the wall 1010 or the rounded rectangular edge 1006 on the glove mold 100. This allows the first holder 12-1 to releasably connect with the glove mold.

The second holder 12-2 may be aligned with the slot 1008 in the glove mold 1000. Then, the second holder 12-2 may be partially disposed within the slot 1008 in the glove mold 1000. More particularly, the second holder 12-2 is aligned with the curved first sidewall 32-2 on the second holder 12-2 facing the second side 1012 of the slot 1008. The second holder 12-2 is inserted into the slot 1008 and moved laterally away from first holder 12-1. Inserting the second holder 12-2 into the slot 1008 may be accomplished by passing the bottom surface 20-2 of the body 16-2 of the second holder 12-2 downwardly past the rounded rectangular edge 1006. Then, the chamfered surface 46-2 is moved past the rounded rectangular edge 1006. Then, the second holder 12-2 is inserted slightly further to cause the ledge 40-2 of the second holder 12-1 to be disposed slightly beyond the rounded rectangular edge 1006 within the interior volume 1014. In one example, the second holder 12-2 is then slid laterally away from first holder 12-1. Thus, sliding the second holder 12-2 towards the second side 1012 of the rounded rectangular edge 1006 causes the curved first sidewall 32-2 on the second holder 12-2 to engage the wall 1010 of the second side 1012 of the rounded rectangular edge 1006. The top wall 26-2 has a greater dimension than the width of the slot 1008 to engage the top of the mold and prevent the holder 12-2 from falling through the slot 1008 into the interior volume 1014.

In operation, the ledge 40-2 of the second holder 12-2 engages the second side 1012 of the rounded rectangular edge 1006 of the glove mold 1000 from within the interior volume 1014. The second ledge 40-2 operates as a hook or support surface to engage the wall 1010 or the rounded rectangular edge 1006 on the glove mold 100. This allows the second holder 12-2 to releasably connect with the glove mold.

When the first holder 12-1 and second holder 12-2 are moved or slid laterally away from each other towards respective first and second side of the rounded rectangular edge 1006 of the glove mold 1000, the second sidewall 48-1 of the first holder 12-1 and the second sidewall 48-2 of the second holder 12-2 face each other. The center member 14 may then be placed or inserted into slot 1008 such that the center member 14 is positioned or interposed between the first holder 12-1 and the second holder 12-2. More particularly, the center member 14 may be inserted into the slot 1008 by moving the lower depending portion 64 into the slot 1008. Then, continuing to move the lower depending portion 64 further into the interior volume 1014 until the top wall 58 of the center member contacts the glove mold 1000. The center member 14 operates to retain the first holder 12-1 and second holder 12-2 in a desired location by occupying the space between them in the slot 1008 to prevent the first and second holders from sliding towards each other. Thus, effectively, the center member 14 acts as a stop block between the first and second holders 12-1, 12-2.

A first portion of a first connector 52-1, such as a first screw, is inserted through the bore 50-1 on the first holder 12-1. A first portion of a second connector 52-2, such as a second screw, is inserted through the bore 50-2 on the second holder 12-2. The two screws then may be inserted through respective holes on the support structure 1002. Then, respective second portions, such as nuts, of the first and second connectors may then be connected to the first and second screws to couple the glove mold to the support structure via the assembly 10. Or, the bores may be threaded to directly couple with the connectors. Thereafter, the glove mold 1000 may be used to form a glove by dipping the glove in liquefied material as previously discussed.

Then, disassembly of the glove mold 1000 from the support structure 1002 may occur in the reverse as to what was previously described. Namely, the connectors may be disconnected. Then, the screws may be removed from assembly 10. Then, the center member 14 may be removed from is interposition between the first holder 12-1 and the second holder 12-2. Removal of the center member 14 allows the first and second holders to be slid away from the respective first and second sides of the rounded rectangular edge 1006. Once away from the edge 1006, then the holders may be removed from the slot 1008 on the glove mold 1000.

The glove manufacturing system of the present disclosure, which is effectuated by the assembly 10, may additionally include one or more sensor to sense or gather data pertaining to the surrounding environment or operation of the glove manufacturing system. Some exemplary sensors capable of being electronically coupled with the glove manufacturing system (either directly connected to the mold 1000 or assembly 10 or remotely connected thereto) may include but are not limited to: accelerometers sensing accelerations experienced during rotation, translation, velocity/speed, location traveled, elevation gained; gyroscopes sensing movements during angular orientation and/or rotation, and rotation; altimeters sensing barometric pressure, altitude change, terrain climbed, local pressure changes, submersion in liquid; impellers measuring the amount of fluid passing thereby; Global Positioning sensors sensing location, elevation, distance traveled, velocity/speed; audio sensors sensing local environmental sound levels, or voice detection; Photo/Light sensors sensing ambient light intensity, ambient, Day/night, UV exposure; TV/IR sensors sensing light wavelength; Temperature sensors sensing machine or motor temperature, ambient air temperature, and environmental temperature; and Moisture Sensors sensing surrounding moisture levels.

The glove manufacturing system may include wireless communication logic coupled to sensors on the assembly 10, the mold 1000, or another portion of the glove manufacturing system. The sensors gather data and provide the data to the wireless communication logic. Then, the wireless communication logic may transmit the data gathered from the sensors to a remote device. Thus, the wireless communication logic may be part of a broader communication system, in which one or several devices, assemblies, or systems of the present disclosure may be networked together to report alerts and, more generally, to be accessed and controlled remotely. Depending on the types of transceivers installed in the device, assembly 10, mold 1000, or system of the present disclosure, the system may use a variety of protocols (e.g., Wifi, ZigBee, MiWi, Bluetooth) for communication. In one example, each of the devices, assemblies, or systems of the present disclosure may have its own IP address and may communicate directly with a router or gateway. This would typically be the case if the communication protocol is WiFi.

In another example, a point-to-point communication protocol like MiWi or ZigBee is used. One or more of the device, assembly 10, mold 1000, or system of the present disclosure may serve as a repeater, or the devices, assemblies, or systems of the present disclosure may be connected together in a mesh network to relay signals from one device, assembly, or system to the next. However, the individual device, assembly, or system in this scheme typically would not have IP addresses of their own. Instead, one or more of the devices, assemblies, or system of the present disclosure communicates with a repeater that does have an IP address, or another type of address, identifier, or credential needed to communicate with an outside network. The repeater communicates with the router or gateway.

In either communication scheme, the router or gateway communicates with a communication network, such as the Internet, although in some embodiments, the communication network may be a private network that uses transmission control protocol/internet protocol (TCP/IP) and other common Internet protocols but does not interface with the broader Internet, or does so only selectively through a firewall.

The system that receives and processes signals from the device, assembly 10, mold 1000, or glove manufacturing system of the present disclosure may differ from embodiment to embodiment. In one embodiment, alerts and signals from the device, assembly 10, mold 1000, or glove manufacturing system of the present disclosure are sent through an e-mail or simple message service (SMS; text message) gateway so that they can be sent as e-mails or SMS text messages to a remote device, such as a smartphone, laptop, or tablet computer, monitored by a responsible individual, group of individuals, or department, such as a maintenance department. Thus, if a particular device, assembly 10, mold 1000, or glove manufacturing system of the present disclosure creates an alert because of a data point gathered by one or more sensors, that alert can be sent, in e-mail or SMS form, directly to the individual responsible for fixing it. Of course, e-mail and SMS are only two examples of communication methods that may be used; in other embodiments, different forms of communication may be used.

In other embodiments, alerts and other data from the sensors on the device, assembly 10, mold 1000, or glove manufacturing system of the present disclosure may also be sent to a work tracking system that allows the individual, or the organization for which he or she works, to track the status of the various alerts that are received, to schedule particular workers to repair a particular device, assembly 10, mold 1000 or glove manufacturing system of the present disclosure, and to track the status of those repair jobs. A work tracking system would typically be a server, such as a Web server, that provides an interface individuals and organizations can use, typically through the communication network. In addition to its work tracking functions, the work tracker may allow broader data logging and analysis functions. For example, operational data may be calculated from the data collected by the sensors on the device, assembly 10, mold 1000 or glove manufacturing system of the present disclosure, and the system may be able to provide aggregate machine operational data for a device, assembly 10, mold 1000, or glove manufacturing system of the present disclosure or group of devices, assemblies 10, molds 1000 or systems of the present disclosure.

The system also allows individuals to access the device, assembly 10, mold 1000, or glove manufacturing system of the present disclosure for configuration and diagnostic purposes. In that case, the individual processors or microcontrollers of the device, assembly 10, mold 1000 or glove manufacturing system of the present disclosure may be configured to act as Web servers that use a protocol like hypertext transfer protocol (HTTP) to provide an online interface that can be used to configure the glove manufacturing system. In some embodiments, the systems may be used to configure several glove manufacturing systems of the present disclosure at once. For example, if several glove manufacturing system are of the same model and are in similar locations in the same location, it may not be necessary to configure the glove manufacturing systems individually. Instead, an individual may provide configuration information, including baseline operational parameters, for several devices, assemblies, or glove manufacturing systems at once.

As described herein, aspects of the present disclosure may include one or more electrical, pneumatic, hydraulic, or other similar secondary components and/or systems therein.

The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The operation of the glove manufacturing system in the above-described embodiments can be implemented in any of numerous ways. For example, embodiments of technology for the glove manufacturing system disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software, and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An assembly for holding a glove mold, the assembly comprising:
   a first holder having a first ledge adapted to engage a first side of an edge defining a slot in a glove mold;
   a second holder having a second ledge adapted to engage a second side of the edge defining the slot in the glove mold; and
   a center member adapted to be interposed between the first holder and the second holder.

2. The assembly of claim 1, further comprising:
   a first connector associated with the first holder adapted to connect the first holder to a platform that supports the glove mold.

3. The assembly of claim 2, further comprising:
   a second connector associated with the second holder adapted to connect the second holder to the platform that supports the glove mold.

4. The assembly of claim 1, further comprising:
   a first convexly curved sidewall extending from the first ledge on the first holder.

5. The assembly of claim 4, further comprising:
   a radius of curvature of the first convexly curved sidewall, wherein the radius of curvature is complementary to that of the first side of the edge defining the slot in the glove mold.

6. The assembly of claim 4, further comprising:
   a second convexly curved sidewall extending from the second ledge on the second holder; and
   a radius of curvature of the second convexly curved sidewall, wherein the radius of curvature of the second convexly curved sidewall is complementary to that of the second side of the edge defining the slot in the glove mold.

7. The assembly of claim 1, wherein the center member is T-shaped in configuration.

8. The assembly of claim 1, further comprising:
a flat sidewall on the first holder; and
a lower depending portion on the center member, wherein the flat sidewall abuts the lower depending portion on the center member.

9. The assembly of claim 1, further comprising:
a top wall on the first holder, wherein the top wall is D-shaped in configuration.

10. The assembly of claim 1, further comprising:
a first bore extending fully through the first holder; and
a second bore extending fully through the second holder.

11. A holder for a glove mold, the holder comprising:
a body having a top surface opposite a bottom surface, wherein a vertical direction is defined between the top surface and the bottom surface;
a vertical axis extending through the body;
a curved first sidewall positioned between the top surface and the bottom surface, wherein the curved first sidewall has a radius of curvature relative to the vertical axis;
a ledge positioned between the curved first sidewall and the bottom surface, wherein the ledge extends radially farther from the vertical axis than the curved first sidewall, and the ledge is adapted to engage an edge defining a slot in a glove mold;
a second sidewall extending between the top surface and the bottom surface, wherein at least a portion of the second sidewall is flat and offset parallel to the vertical axis.

12. The holder of claim 11, further comprising:
a chamfered surface positioned between the ledge and the bottom surface.

13. The holder of claim 11, further comprising:
a bore defined in the body, wherein the bore extends in the vertical direction.

14. The holder of claim 13, wherein the bore extends fully from the top surface to the bottom surface.

15. The holder of claim 11, further comprising a channel formed in the curved first sidewall.

16. A method comprising:
inserting a first holder having a first ledge into a slot defined in a glove mold;
moving the first holder laterally towards a first side of the slot;
inserting a second holder having a second ledge into the slot defined in the glove mold;
moving the second holder laterally towards a second side of the slot; and
supporting the glove mold via the first ledge and the second ledge.

17. The method of claim 16, further comprising:
coupling the first holder to a support structure via a first connector that extends into a first bore defined in the first holder; and
coupling the second holder to the support structure via a second connector that extends into a second bore defined in the second holder.

18. The method of claim 16, further comprising:
abutting a first convexly curved sidewall on the first holder with a wall defining an edge of the slot at the first side; and
abutting a second convexly curved sidewall on the second holder with the wall defining the edge of the slot at the second side.

19. The method of claim 16, further comprising:
inserting a center member into the slot between the first holder and the second member after the first holder and second holder have been laterally moved.

20. The method of claim 16, further comprising:
dipping the glove mold into a container of liquefied glove material;
removing the glove mold from the container; and
permitting the liquefied glove material to cure into a glove.

* * * * *